US011933471B1

(12) United States Patent
Lara Monarrez et al.

(10) Patent No.: US 11,933,471 B1
(45) Date of Patent: Mar. 19, 2024

(54) VEHICLE LIGHTING ASSEMBLY WITH COVERED LIGHT BLADE AND LIGHTING METHOD

(71) Applicant: Ford Global Technologies, LLC, Dearborn, MI (US)

(72) Inventors: Omar Benjamin Lara Monarrez, Canton, MI (US); Mark Kaski, Royal Oak, MI (US); Derek English, Detroit, MI (US); Dean Carbis, Bloomfield Hills, MI (US); Robert Todd Laster, Wixom, MI (US); Brandon Schwandt, Madison Heights, MI (US); Linsheng Chen, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/163,356

(22) Filed: Feb. 2, 2023

(51) Int. Cl.
*F21S 43/241* (2018.01)
*F21S 43/20* (2018.01)

(52) U.S. Cl.
CPC ............ *F21S 43/241* (2018.01); *F21S 43/26* (2018.01)

(58) Field of Classification Search
CPC ...... F21S 43/241; F21S 43/235; F21S 43/236; F21S 43/237; F21S 43/239; F21S 43/242; F21S 43/243; F21S 43/245; F21S 43/247; F21S 43/249; F21S 43/251; F21S 43/255; G02B 6/003; F21V 5/008
See application file for complete search history.

(56) References Cited

U.S. PATENT DOCUMENTS

| | | | | |
|---|---|---|---|---|
| 10,184,635 | B2 | 1/2019 | Childress et al. | |
| 10,703,263 | B2 | 7/2020 | Salter et al. | |
| 10,724,729 | B2 * | 7/2020 | Williams ............. | F21S 41/147 |
| 10,920,955 | B2 | 2/2021 | Belcher et al. | |
| 11,441,754 | B1 | 9/2022 | Johnson et al. | |
| 2010/0195342 | A1 * | 8/2010 | Lambert ............. | G02B 6/0096 362/511 |

FOREIGN PATENT DOCUMENTS

| | | | |
|---|---|---|---|
| WO | WO-2023072988 A1 * | 5/2023 | |

* cited by examiner

*Primary Examiner* — Robert J May
(74) *Attorney, Agent, or Firm* — Vichit Chea; Carlson, Gaskey & Olds, P.C.

(57) ABSTRACT

A vehicle lighting assembly includes a primary lens and a light source on a first side of the primary lens. The light source is configured to emit light through the primary lens. A light blade is on an opposite, second side of the primary lens. A secondary lens covers a portion of the light blade. A vehicle lighting method includes emitting light from a light source, directing the light through a primary lens, directing the light from the primary lens through a light blade, and directing the light from the light blade through a secondary lens.

19 Claims, 5 Drawing Sheets

VEHICLE LIGHTING ASSEMBLY WITH COVERED LIGHT BLADE AND LIGHTING METHOD

TECHNICAL FIELD

This disclosure relates generally to a lighting assembly for a vehicle and, more particularly, to a lens for a light blade of the lighting assembly.

BACKGROUND

Vehicles include various types of lighting assemblies. Some lighting assemblies include a lens covering a light source. The lighting assemblies are illuminated when light from the light source moves from the lamp assembly through the lens. Lighting assemblies can include headlamps, tail lamps, side markers, etc.

SUMMARY

In some aspects, the techniques described herein relate to a vehicle lighting assembly, including: a primary lens; a light source on a first side of the primary lens, the light source configured to emit light through the primary lens; a light blade on an opposite, second side of the primary lens; and a secondary lens that covers a portion of the light blade.

In some aspects, the techniques described herein relate to a vehicle lighting assembly, wherein the light blade is mechanically fastened to the primary lens.

In some aspects, the techniques described herein relate to a vehicle lighting assembly, wherein a least a portion of the light blade is received within a recessed area of the primary lens.

In some aspects, the techniques described herein relate to a vehicle lighting assembly, further including a light housing assembly, the light source within a cavity provided by the light housing assembly and the primary lens, the light blade and the secondary lens outside the cavity.

In some aspects, the techniques described herein relate to a vehicle lighting assembly, wherein the light source is within the cavity, and the light blade is outside the cavity.

In some aspects, the techniques described herein relate to a vehicle lighting assembly, wherein the light blade is a first light blade and the secondary lens is a first secondary lens, and further including a second light blade on an opposite, second side of the primary lens, second light blade at least partially covered by a second secondary lens.

In some aspects, the techniques described herein relate to a vehicle lighting assembly, wherein the light blade includes a textured region of the light blade, the secondary lens covering at least the textured region of the light blade.

In some aspects, the techniques described herein relate to a vehicle lighting assembly, wherein the secondary lens is secured to the light blade to provide a sealed cavity between the secondary lens and the light blade.

In some aspects, the techniques described herein relate to a vehicle lighting assembly, wherein the sealed cavity is a light blade sealed cavity, wherein a light housing is secured to the primary lens to provide a light source sealed cavity, wherein an entirety of the light blade sealed cavity is outside the light source sealed cavity.

In some aspects, the techniques described herein relate to a vehicle lighting assembly, wherein the secondary lens is secured to the light blade with laser welds.

In some aspects, the techniques described herein relate to a vehicle lighting assembly, wherein a gap between the secondary lens and the light blade is 0.5 millimeters or less.

In some aspects, the techniques described herein relate to a vehicle lighting assembly, wherein at least a portion of the light blade is exposed and uncovered by the secondary lens.

In some aspects, the techniques described herein relate to a vehicle lighting assembly, further including a collimator configured to redirect light from the light source through the primary lens and to the light blade.

In some aspects, the techniques described herein relate to a vehicle lighting assembly, wherein the light source, the primary lens, the light blade, and the secondary lens are constituents of a rear taillight of a vehicle, wherein the light blade projects rearward from the lens relative to an orientation of the vehicle.

In some aspects, the techniques described herein relate to a vehicle lighting assembly, wherein the light source is an exchangeable Light Emitting Diode module.

In some aspects, the techniques described herein relate to a vehicle lighting assembly, wherein the light blade includes a vertically extending portion and a horizontally extending portion.

In some aspects, the techniques described herein relate to a vehicle lighting method, including: emitting light from a light source; directing the light through a primary lens; directing the light from the primary lens through a light blade; and directing the light from the light blade through a secondary lens.

In some aspects, the techniques described herein relate to a vehicle lighting method, wherein the light blade is removably attached to the primary lens.

In some aspects, the techniques described herein relate to a vehicle lighting method, further including directing the light through a textured region of the light blade.

In some aspects, the techniques described herein relate to a vehicle lighting method, wherein the light source is inside a cavity provided by a light housing and the primary lens.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

This disclosure relates generally to a lighting assembly for a vehicle and, in particular, a lighting assembly having a light blade secured to a lens.

Figure 1:
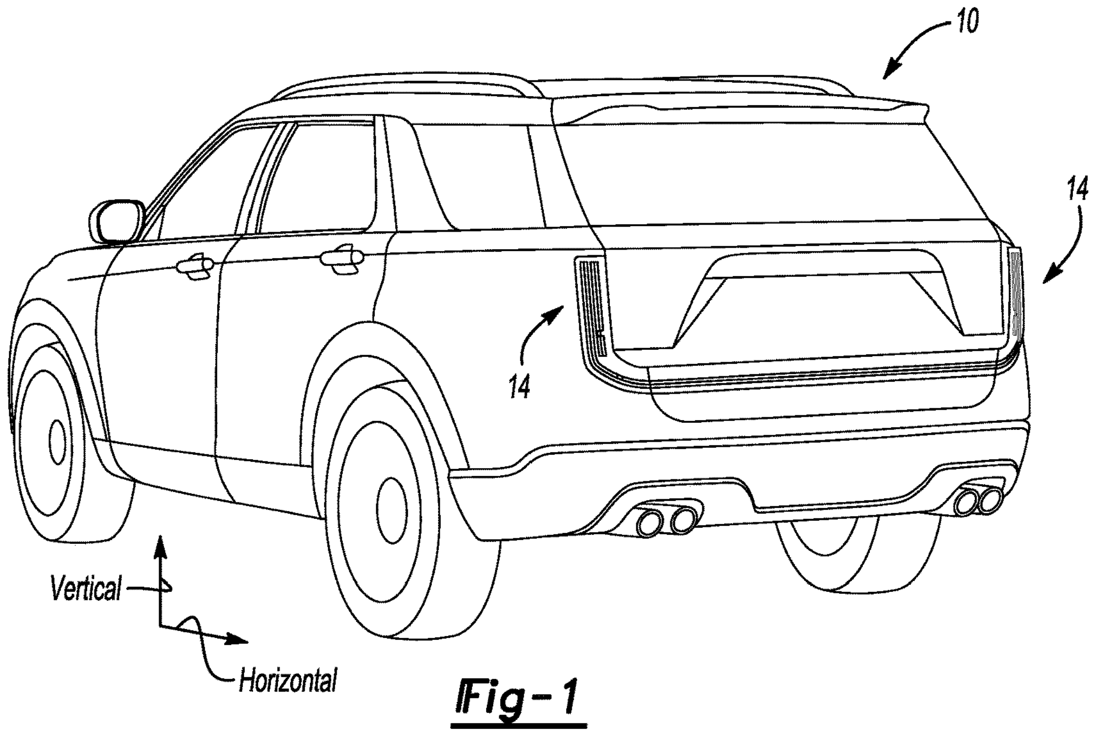
FIG. 1 illustrates a rear view of a portion of a vehicle incorporating lighting assemblies according to an exemplary embodiment of the present disclosure.
Figure 2:
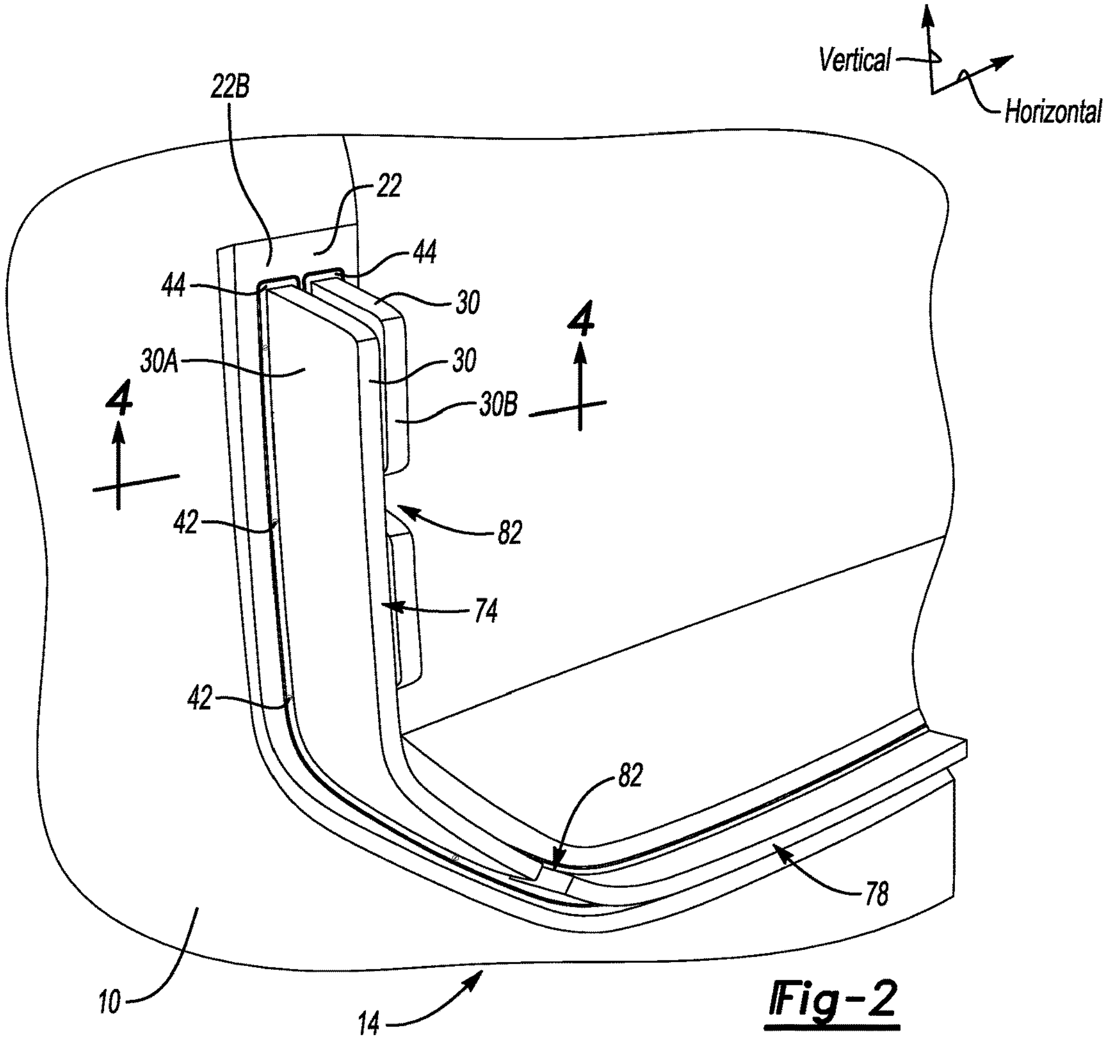
FIG. 2 illustrates a closeup view of a lighting assembly from FIG. 1.
Figure 3:
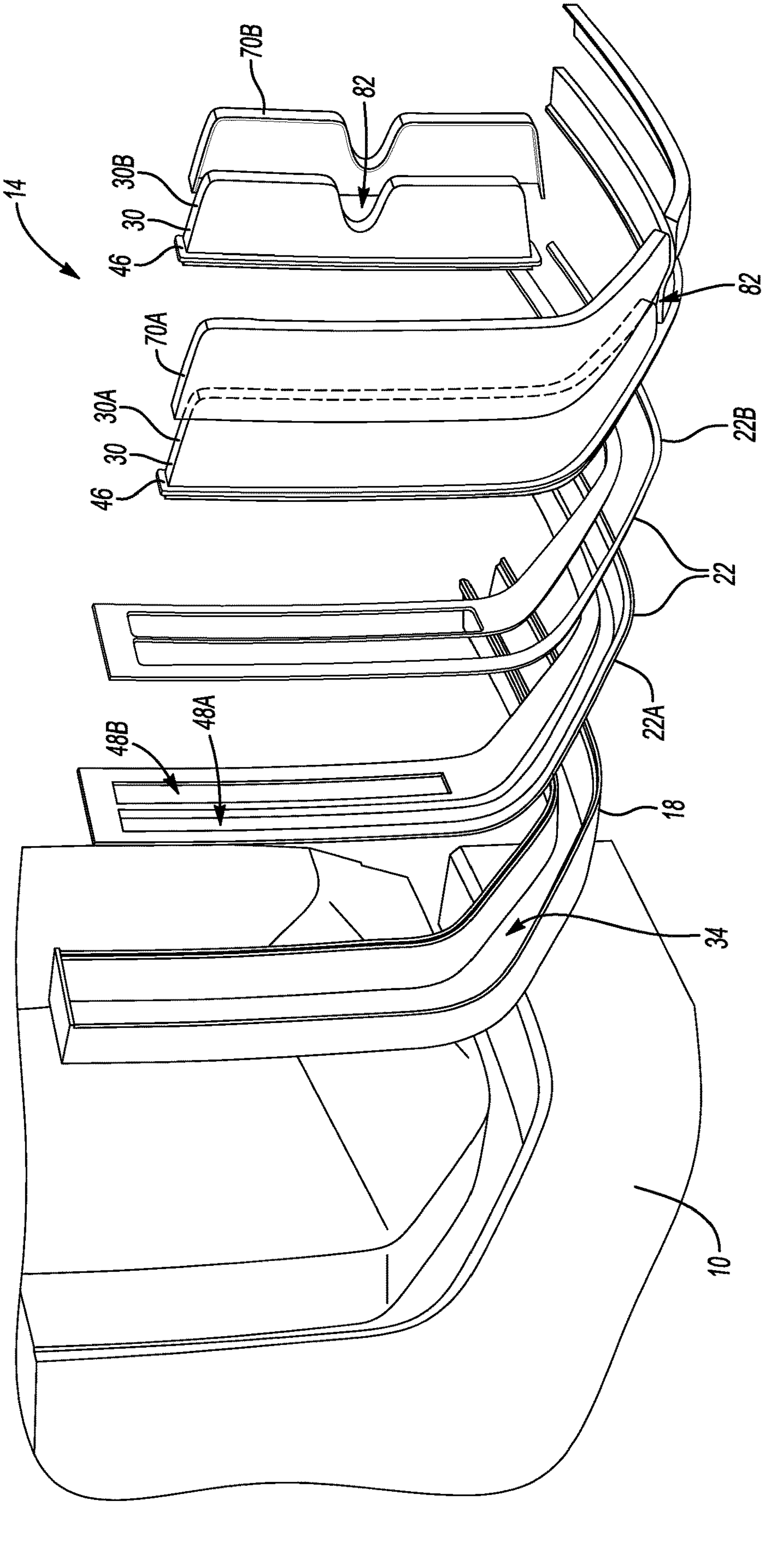
FIG. 3 illustrates an expanded view of selected portions of the lighting assembly of FIG. 2.
Figure 4:
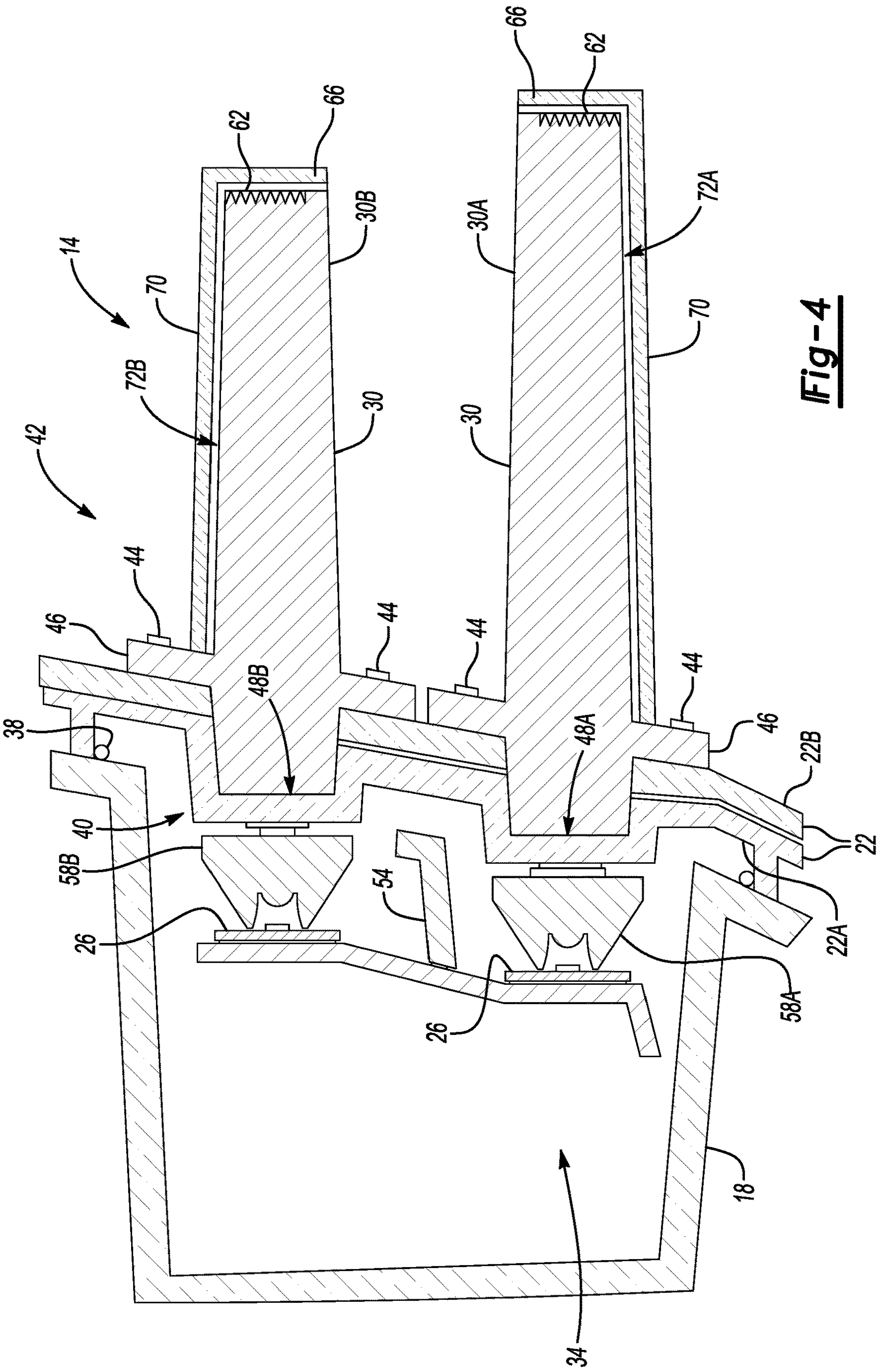
FIG. 4 illustrates a section view taken at line 4-4 in FIG. 2.
Figure 5:
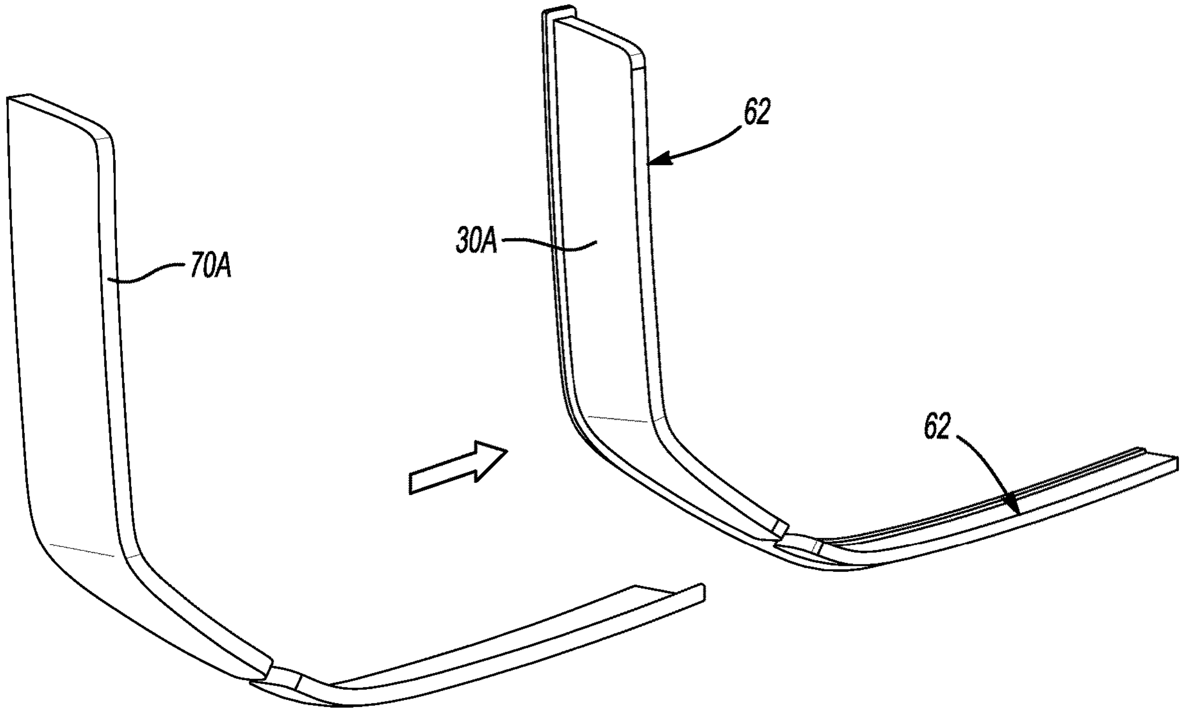
FIG. 5 illustrates an expanded view of a first light blade and a secondary lens.
Figure 6:
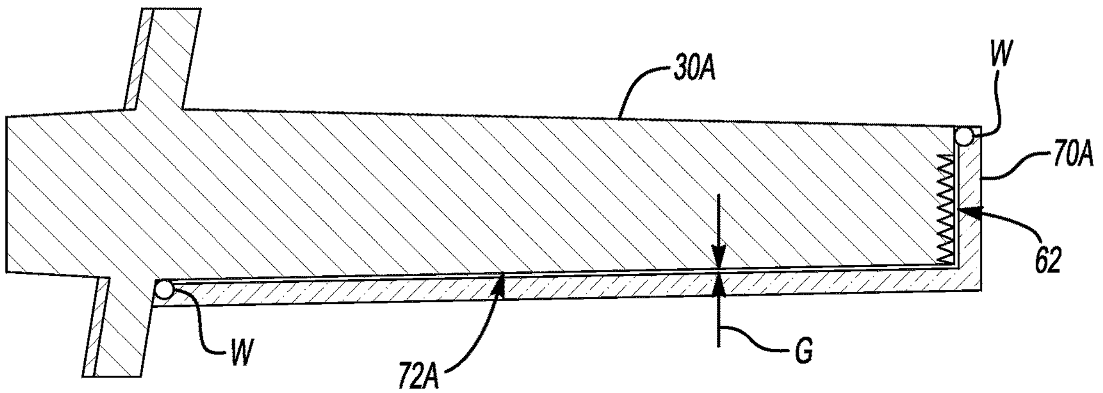
FIG. 6 illustrates a section view of the secondary lens secured to the first light blade of FIG. 5.
Figure 7:
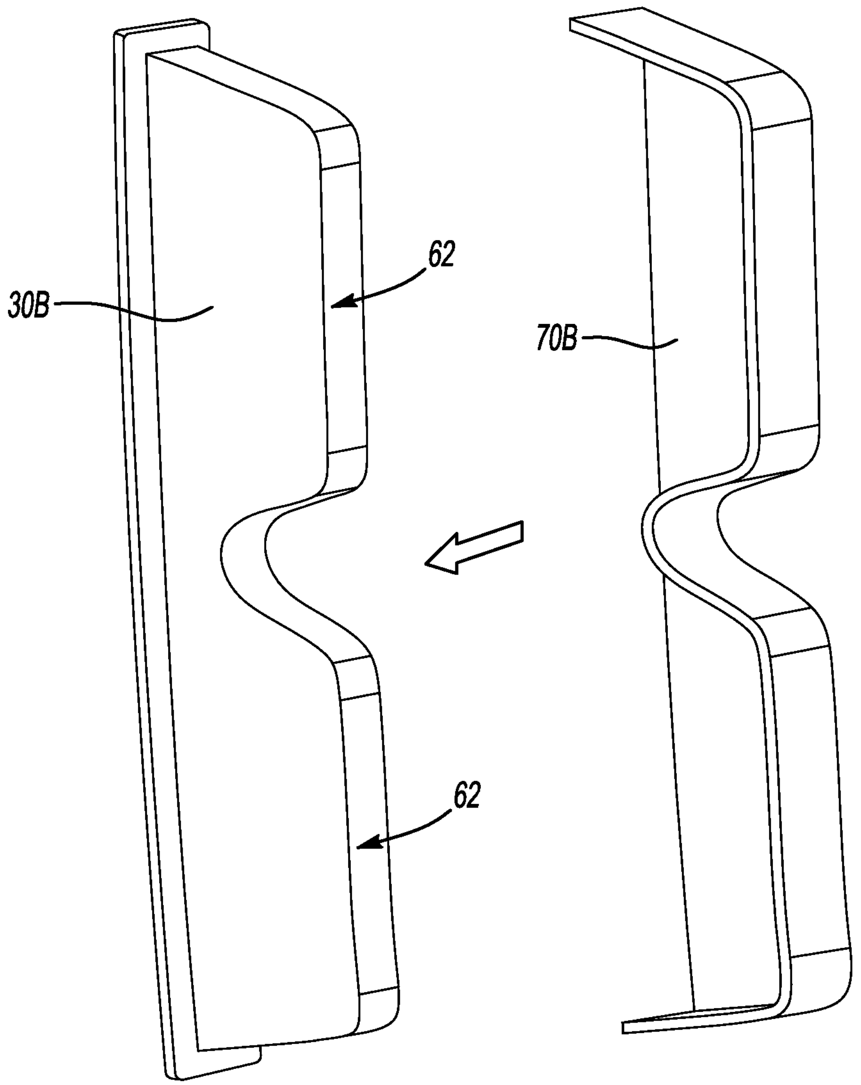
FIG. 7 illustrates an expanded view of a second light blade and a secondary lens.

With reference to FIG. 1, a vehicle 10 includes at least one lighting assembly 14. In this example, the at least one lighting assembly 14 is a rear taillight assembly of the vehicle 10. Although the example lighting assembly 14 is a taillight, the teachings of this disclosure apply to other types of lighting assemblies, including other vehicle lighting assemblies such as headlights and interior lights.

With reference now to FIGS. 2-7 and continuing reference to FIG. 1, the lighting assembly 14 includes a light housing 18, a primary lens 22, at least one light source 26, and at least one light blade 30. The light housing 18 and the primary lens 22, in this example, provide a cavity 34.

The cavity 34 is a sealed cavity. In this example, a seal 38 is disposed at an interface between the primary lens 22 and the light housing 18. The seal 38 blocks moisture and contaminants from entering the cavity 34.

The at least one light source 26 is disposed within the cavity 34 on a first side 40 of the primary lens 22. In this example, the at least one light source 26 includes two light sources 26A and 26B, which can each be exchangeable Light Emitting Diode modules.

The at least one light blade 30 is outside the cavity 34 on an opposite, second side 42 of the primary lens 22. In this example, the at least one light blade 30 includes two light blades 30A and 30B.

A plurality of mechanical fasteners 44 removably attached the at least one light blade 30 to the primary lens 22 in this example. The mechanical fasteners 44 could be threaded fasteners, such as screws. In this example, the at least one light blade 30 includes a collar 46. The mechanical fasteners 44 can extend through apertures in the collar 46 to secure the at least one light blade 30 to the primary lens 22. The at least one light blade 30 can be replaced by disengaging the mechanical fasteners 44.

The primary lens 22 includes a recessed area 48A and a recessed area 48B. At least a portion of the light blade 30A is received within the recessed area 48A. At least a portion of the light blade 30B is received within the recessed area 48B. The recessed areas 48A and 48B can, among other things, help to align the respective light blades 30A and 30B relative to the primary lens 22.

The primary lens 22 can be a two-shot lens. The first shot provides a clear layer 22A. The second shot provides an opaque layer 22B. Selected areas of the clear layer 22A are left uncovered by the opaque layer 22B. The at least one light blade 30 interfaces with these areas of the clear layer 22A. The opaque layer 22B covers other areas of the clear layer 22A so that light that is emitted from the primary lens 22 moves to the at least one light blade 30 rather than to the surrounding environment.

The light source 26A is configured to emit light through a portion of the primary lens 22 into the first light blade 30A. The light source 26B is configured to emit light through another portion of the primary lens 22 into the second light blade 30B.

The cavity 34 holds a light blocking bezel 54, which is positioned to block at least some of the light emitted from the first light source 26A from moving to the second light blade 30B, and at least some of the light emitted from the second light source 26B from moving to the first light blade 30A.

The cavity 34 holds a first collimator 58A and a second collimator 58B. The first collimator 58A is configured to redirect light emitted from the first light source 26A to the first light blade 30A. The second collimator 58B is configured to redirect light emitted from the second light source 26B to the second light blade 30B.

The at least one light blade 30 projects from the primary lens 22. As the example lighting assembly 14 is a rear taillight, the at least one light blade 30 projects rearward relative to an orientation of the vehicle 10.

The at least one light blade 30 includes a textured region 62, which can be considered optics of the at least one light blade 30. The textured region 62 can include a grain, texture, or optics. The optics can consist of either pillow, groove, and/or chisel optics. The textured region 62 can collect and redistribute the light to meet design goals.

In this example, the textured region 62 is included along a rearward facing surface 66 of the at least one light blade 30. When the light source 26 is emitting light, an individual viewing a rear of the vehicle 10 would be able to see light emitted through the textured region 62.

In this example, exposed surfaces of the collars 46 of the at least one light blade 30 can be painted to block light from being emitted from the collars 46. The light is instead directed through the at least one light blade 30 toward the textured region 62. In another example, the at least one light blade 30 is formed via a two-shot molding process with one of the shots providing an opaque layer that covers the collars 46 to block light rather than using a painted on layer.

A secondary lens 70A is secured to the at least one light blade 30A. A secondary lens 70B is secured to the light blade 30B. The secondary lenses 70A and 70B can be secured via laser welds W, for example. The secondary lenses 70A and 70B cover at least the respective textured regions 62 of the light blades 30A and 30B. Leaving the textured regions 62 exposed to the elements can impact performance. The secondary lenses 70A and 70B overtop the textured regions 62, but spaced from the textured regions 62, can shield the textured regions 62 without affecting performance.

The secondary lens 70A is secured to the light blade 30A to provide a cavity 72A between the secondary lens 70A and the light blade 30A. The secondary lens 70B is secured to the light blade 30B to provide a cavity 72B between the secondary lens 70B and the light blade 30B. The cavities 72A can be considered light blade sealed cavities whereas the cavity 34 can be considered a light source sealed cavity. Both the cavities 72A and 72B are completely outside the cavity 34. The welds W can extend along the perimeter of the secondary lenses 70A and 70B to seal the cavities 72A and 72B.

The secondary lenses 70A and 70B, when secured, are close to the respective light blade 30A or 30B. A gap G between the secondary lenses 70A and 70B and the respective light blade 30A or 30B is 0.5 millimeters or less in this example. No portions of the secondary lenses 70A or 70B contact the respective textured regions 62 of the light blades 30A and 30B.

In this example, the secondary lens 70A and 70B do not cover all areas of the light blade 30 that are projecting from the primary lens 22. At least a portion of the light blades 30 are exposed and uncovered by the secondary lenses 70 or the primary lens 22. In another example, the portions of the light blade 30 projecting from the primary lens 22 could be completely covered by the secondary lens 70A or 70B. While the secondary lens 70A and 70B are used to cover the textured regions 62, other areas could be covered to provide, for example, a desired aesthetic.

The example first light blade 30A and the second light blade 30B are polymer-based materials. The first light blade 30A and the second light blade 30B can be different colors to provide a desired lighting effect. In this example, the first light blade 30A is red and the second light blade 30B is yellow.

The at least one light blade 30 focuses and redirects light emitted by the at least one light source 26 within the cavity 34. The at least one light blade 30 distributes and evens out emitted light, which can help to eliminate hot spots of light.

In this example, the first light blade 30A includes a vertically extending portion 74 that curves to transition into a horizontally extending portion 78. The second light blade 30B extends vertically, but not horizontally in this example. The first light blade 30A and the second light blade 30B each include a notch 82. Vertical and horizontal, for purposes of this disclosure, are with reference to ground and an ordinary orientation of the vehicle 10 during operation.

The first light blade 30A and the second light blade 30B can each be selectively illuminated to provide a turn signal, a stop light, a daytime running light, etc.

Some features of the disclosed examples include positioning a light blade outside a sealed cavity of a lighting assembly. This positioning facilitates replacement of the light blade and can aesthetically enhance the lighting assembly. The light blade can provide a three-dimensional illuminated effect.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle lighting assembly, comprising: a primary lens;
- a light source on a first side of the primary lens,
- a light blade on an opposite, second side of the primary lens; and
- a secondary lens that covers a portion of the light blade, the light source configured to emit light through the primary lens that then passes through the light blade and the secondary lens wherein at least a portion of the light blade is received within a recessed area of the primary lens.

2. The vehicle lighting assembly of claim 1, wherein the light blade is mechanically fastened to the primary lens.

3. The vehicle lighting assembly of claim 1, further comprising a light housing assembly, the light source within a cavity provided by the light housing assembly and the primary lens, the light blade and the secondary lens outside the cavity.

4. The vehicle lighting assembly of claim 3, wherein the light source is within the cavity, and the light blade is outside the cavity.

5. The vehicle lighting assembly of claim 1, wherein the light blade is a first light blade and the secondary lens is a first secondary lens, and further comprising a second light blade on the opposite, second side of the primary lens, the second light blade at least partially covered by a second secondary lens.

6. The vehicle lighting assembly of claim 1, wherein the light blade includes a textured region of the light blade, the secondary lens covering at least the textured region of the light blade.

7. The vehicle lighting assembly of claim 1, wherein the secondary lens is secured to the light blade to provide a sealed cavity between the secondary lens and the light blade.

8. A vehicle lighting assembly, comprising:
- a primary lens;
- a light source on a first side of the primary lens, the light source configured to emit light through the primary lens;
- a light blade on an opposite, second side of the primary lens; and
- a secondary lens that covers a portion of the light blade,
- wherein the secondary lens is secured to the light blade to provide a sealed cavity between the secondary lens and the light blade,
- wherein the sealed cavity is a light blade sealed cavity, wherein a light housing is secured to the primary lens to provide a light source sealed cavity, wherein an entirety of the light blade sealed cavity is outside the light source sealed cavity.

9. The vehicle lighting assembly of claim 1, wherein the secondary lens is secured to the light blade with laser welds.

10. The vehicle lighting assembly of claim 1, wherein a gap between the secondary lens and the light blade is 0.5 millimeters or less.

11. The vehicle lighting assembly of claim 1, wherein at least a portion of the light blade is exposed and uncovered by the secondary lens.

12. The vehicle lighting assembly of claim 1, further comprising a collimator configured to redirect light from the light source through the primary lens and to the light blade.

13. The vehicle lighting assembly of claim 1, wherein the light source, the primary lens, the light blade, and the secondary lens are constituents of a rear taillight of a vehicle, wherein the light blade projects rearward from the primary lens relative to an orientation of the vehicle.

14. The vehicle lighting assembly of claim 1, wherein the light source is an exchangeable Light Emitting Diode module.

15. The vehicle lighting assembly of claim 1, wherein the light blade includes a vertically extending portion and a horizontally extending portion.

16. A vehicle lighting method, comprising:
- emitting light from a light source;
- directing the light through a primary lens;
- directing the light from the primary lens through a light blade; and
- directing the light from the light blade through a secondary lens wherein at least a portion of the light blade is received within a recessed area of the primary lens.

17. The vehicle lighting method of claim 16, wherein the light blade is removably attached to the primary lens.

18. The vehicle lighting method of claim 16, further comprising directing the light through a textured region of the light blade.

19. The vehicle lighting method of claim 16, wherein the light source is inside a cavity provided by a light housing and the primary lens.

* * * * *